(No Model.)
J. RADDIN.
WAGON AXLE AND BOX.
No. 500,427. Patented June 27, 1893.
Fig. 1.
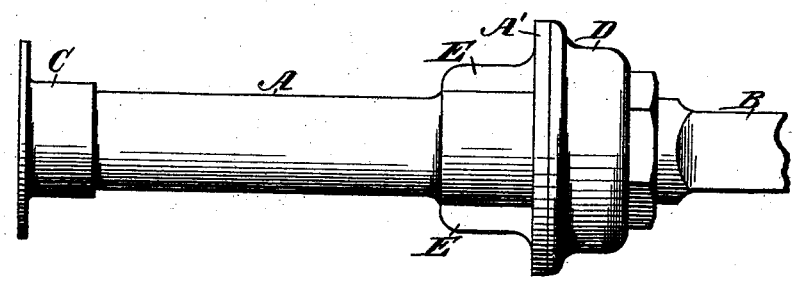
Fig. 2.
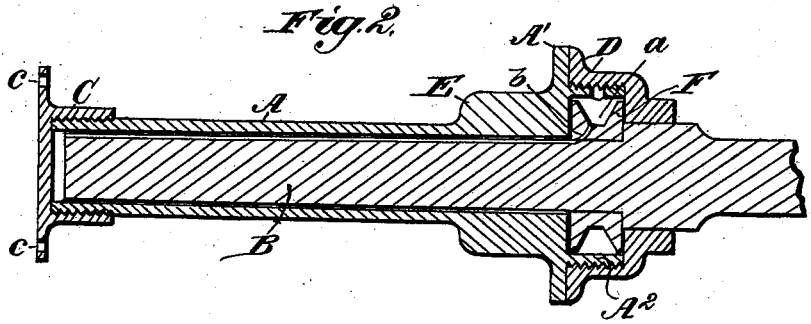
Fig. 3.
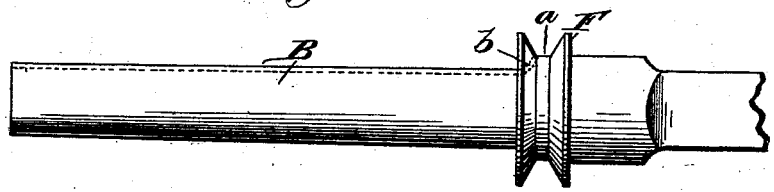
Fig. 4.
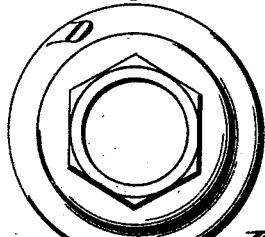
Fig. 5.
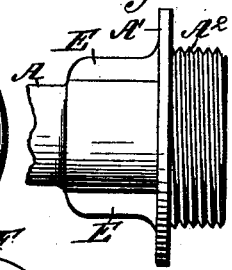
Fig. 6.
Fig. 7.
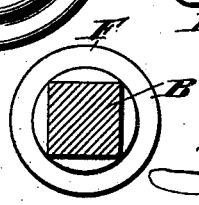
Fig. 8.
Witnesses:
Robert Barrett,
J. H. Daly.
Inventor:
John Raddin.
By James L. Norris, Atty.
THE NORRIS PETERS CO., PHOTO-LITHO., WASHINGTON, D. C.

UNITED STATES PATENT OFFICE.

JOHN RADDIN, OF LYNN, MASSACHUSETTS.

WAGON AXLE AND BOX.

SPECIFICATION forming part of Letters Patent No. 500,427, dated June 27, 1893.

Application filed March 30, 1892. Serial No. 427,133. (No model.)

*To all whom it may concern:*

Be it known that I, JOHN RADDIN, a citizen of the United States, residing at Lynn, in the county of Essex and State of Massachusetts, have invented certain new and useful Improvements in Wheel Axles and Boxes, of which the following is a full, clear, and exact specification.

This invention relates to axles and boxes for the wheels of vehicles, and has for its object to provide a new and improved construction, whereby the box is securely retained on the axle and the latter can be lubricated in a simple, efficient and economical manner.

To accomplish this object the invention consists essentially in the combination of an axle having an immovably fixed collar formed with an annular groove and a channel leading from the groove to the surface of the axle spindle, an axle box formed at its inner end with a fixed collar bearing against the outer side of the grooved collar and having a screw-threaded tubular extension which extends entirely over and surrounds said grooved collar, and a nut bearing against the rear side of the grooved collar and engaging the screw-threaded extension which projects over and surrounds said grooved collar on the collar of the axle box, as will more fully hereinafter appear.

The invention is illustrated by the accompanying drawings, in which—

Figure 1, is a side elevation of a portion of a vehicle axle and axle box constructed in accordance with my invention. Fig. 2, is a longitudinal central sectional view of the same. Fig. 3, is a detail side elevation of the axle spindle and a portion of the axle. Fig. 4, is a detail side view of the nut for retaining the axle box on the axle spindle. Fig. 5, is a plan view of the same. Fig. 6, is a detail side view of the inner end of the axle box. Fig. 7, is a detail sectional view of the nut for retaining the axle box on the axle spindle, and Fig. 8 is a detail sectional view of the axle showing the annularly grooved collar thereupon.

In order to enable those skilled in the art to make and use my invention I will now describe the same in detail, referring to the drawings wherein—

The letter B indicates an axle and axle spindle having at the inner end of the spindle a collar F which is shrunk or otherwise applied so that it is immovably fixed in position. This collar is constructed with an annular oil containing groove $a$ and a channel $b$ leading from the groove to the surface of the axle spindle, so that oil contained in the groove will be gradually supplied to the surface of the spindle.

The axle box A is formed integral at its inner end with an annular collar A', and radial ribs E adapted to enter recesses in the wheel hub so that the axle box cannot turn independent of the wheel. The face of the collar A' bears against the outer side of the annularly grooved collar F on the axle and this collar is formed integral with a laterally projecting tubular extension $A^2$ which is externally screw-threaded and is of a length co-extensive with the thickness of the grooved collar, in such manner that said tubular extension projects directly over and surrounds and incloses the grooved collar. By this construction the tubular extension constitutes a wall to the annular groove in the collar F and thereby converts this groove into an oil chamber. The externally threaded part of the tubular extension F is engaged with a nut D which rests on the axle and bears against the inner side of the collar F. This nut can be tightened up so as to bear against the collar A' and consequently the axle box is securely retained in position by reason of the collar A' bearing directly against the grooved collar F and the nut D bearing directly against the said grooved collar. The outer end of the axle box is provided with a screw thread with which engages a nut C having an annular flange provided with orifices $c$ by which said flange can be rigidly secured to the hub of a wheel for the purpose of preventing displacement of the nut from the axle box. The nut C is so constructed that when tightened up there will be a small oil space or chamber between the outer end of the axle spindle and the inner side of the said nut. The annularly grooved collar F is permanently and immovably fixed to the axle and when the nut D is screwed upon the tubular extension $A^2$, the axle box will be properly retained in position. To remove the axle box it is only necessary to unscrew the nut D and to supply oil to the annular groove *a* it is not necessary to remove the wheel but only to partially unscrew the nut D so that oil can be introduced.

The construction described and shown entirely avoids the employment of washers while it effectually excludes dust and dirt and prevents the escape of oil.

Having thus described my invention, what I claim is—

1. In a wheel axle, the combination of an axle having the attached collar F formed with an annular oil containing groove *a* and an oil channel *b* leading therefrom to the surface of the axle spindle, the axle-box A formed at its inner end with a fixed collar A' bearing against the front side of the grooved collar on the axle and having a screw threaded tubular extension A² which projects entirely over and surrounds and incloses said grooved collar, and a nut D bearing against the inner side of the grooved collar and engaging the screw threaded extension which projects over and surrounds said grooved collar, substantially as described.

2. In a vehicle axle, the combination of an axle having the immovable and permanently attached collar F formed with an annular groove *a* and a channel *b* leading therefrom to the surface of the axle spindle, the axle box A formed at its inner end with radial wings E and a fixed collar A' bearing against the outer side of the grooved collar on the axle and having a screw threaded tubular extension A² which projects entirely over and surrounds and incloses said grooved collar, a nut D bearing against the inner side of the grooved collar and engaging the screw threaded extension which projects over and surrounds said grooved collar, and a nut C engaging the outer end of the axle box and provided with a perforated flange for rigidly securing it to a wheel hub, substantially as described.

In testimony whereof I have signed my name to this specification, in the presence of two subscribing witnesses, on this 26th day of March, A. D. 1892.

JOHN RADDIN.

Witnesses:
 LULU A. PIERCE,
 MINA R. TOZZER.